(12) United States Patent
Oswald et al.

(10) Patent No.: US 11,597,014 B2
(45) Date of Patent: Mar. 7, 2023

(54) ADDITIVE MANUFACTURED CONGLOMERATED POWDER REMOVAL FROM INTERNAL PASSAGES

(71) Applicant: United Technologies Corporation, Farmington, CT (US)

(72) Inventors: Caitlin Oswald, Ellington, CT (US); Jesse R. Boyer, Middletown, CT (US); Wendell V. Twelves, Jr., Glastonbury, CT (US); Monica C. Smith, West Hartford, CT (US); Krzysztof Barnat, Berlin, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 499 days.

(21) Appl. No.: 16/695,877

(22) Filed: Nov. 26, 2019

(65) Prior Publication Data
US 2020/0094326 A1 Mar. 26, 2020

Related U.S. Application Data

(63) Continuation of application No. 15/011,959, filed on Feb. 1, 2016, now abandoned.

(51) Int. Cl.
*B22F 3/24* (2006.01)
*B08B 9/00* (2006.01)
(Continued)

(52) U.S. Cl.
CPC ............... *B22F 3/24* (2013.01); *B08B 9/00* (2013.01); *B22F 5/009* (2013.01); *B22F 5/106* (2013.01); *B22F 10/20* (2021.01); *B23K 15/0086* (2013.01); *B23K 26/342* (2015.10); *B23K 26/70* (2015.10); *B28B 1/001* (2013.01); *B33Y 10/00* (2014.12); *B33Y 40/20* (2020.01); *B33Y 80/00* (2014.12); *F16L 9/02* (2013.01); *B08B 2209/005* (2013.01); *B22F 2003/247* (2013.01);
(Continued)

(58) Field of Classification Search
None
See application file for complete search history.

(56) References Cited

U.S. PATENT DOCUMENTS 5,490,882 A 2/1996 Sachs et al.
6,995,334 B1 2/2006 Kovacevic et al.
(Continued)

FOREIGN PATENT DOCUMENTS

EP 3053731 A1 8/2016
EP 3069805 A2 9/2016
GB 2517490 A 2/2015

OTHER PUBLICATIONS

European Search Report dated Jun. 16, 2017 issued for corresponding European Patent Application No. 17154280.6.
(Continued)

*Primary Examiner* — Colin W. Slifka
(74) *Attorney, Agent, or Firm* — Bachman & LaPointe, P.C.

(57) ABSTRACT

A component includes an additively manufactured component with an internal passage; and an additively manufactured elongated member within the internal passage. A method of additively manufacturing a component including additively manufacturing a component with an internal passage; and additively manufacturing an elongated member within the internal passage concurrent with additively manufacturing the component.

6 Claims, 5 Drawing Sheets

(51) Int. Cl.
*B22F 5/00* (2006.01)
*B22F 10/20* (2021.01)
*B33Y 40/20* (2020.01)
*B33Y 10/00* (2015.01)
*B33Y 80/00* (2015.01)
*B23K 26/342* (2014.01)
*B23K 26/70* (2014.01)
*B22F 5/10* (2006.01)
*B23K 15/00* (2006.01)
*B28B 1/00* (2006.01)
*F16L 9/02* (2006.01)
*B23K 101/10* (2006.01)

(52) U.S. Cl.
CPC ....... *B22F 2998/10* (2013.01); *B22F 2999/00* (2013.01); *B23K 2101/10* (2018.08); *Y02P 10/25* (2015.11)

(56) References Cited

U.S. PATENT DOCUMENTS

| | | |
|---|---|---|
| 7,777,155 B2 | 8/2010 | Twelves, Jr. |
| 8,383,985 B2 | 2/2013 | Twelves, Jr. |
| 8,488,994 B2 | 7/2013 | Hanson et al. |
| 8,506,836 B2 | 8/2013 | Szuromi et al. |
| 8,718,522 B2 | 5/2014 | Chillscyzn et al. |
| 8,879,957 B2 | 11/2014 | Hanson et al. |
| 8,961,167 B2 | 2/2015 | Swanson et al. |
| 8,985,497 B2 | 3/2015 | Mannella et al. |
| 8,994,592 B2 | 3/2015 | Scott et al. |
| 9,023,566 B2 | 5/2015 | Martin |
| 9,023,765 B1 | 5/2015 | Rimmer et al. |
| 9,029,058 B2 | 5/2015 | Martin |
| 9,039,917 B2 | 5/2015 | Szuromi et al. |
| 9,050,753 B2 | 6/2015 | Rodgers et al. |
| 9,050,788 B2 | 6/2015 | Swanson et al. |
| 9,073,263 B2 | 7/2015 | Mannella et al. |
| 9,079,803 B2 | 7/2015 | Xu |
| 9,114,478 B2 | 8/2015 | Scott et al. |
| 9,120,270 B2 | 9/2015 | Chen et al. |
| 9,773,586 B2 | 9/2017 | Karlen et al. |
| 2006/0118532 A1 | 6/2006 | Chung et al. |
| 2016/0228929 A1 | 8/2016 | Williamson et al. |
| 2016/0271697 A1 | 9/2016 | Karlen |

OTHER PUBLICATIONS

European Office Action dated Feb. 12, 2019 issued for corresponding European Patent Application No. 17154280.6.

ADDITIVE MANUFACTURED CONGLOMERATED POWDER REMOVAL FROM INTERNAL PASSAGES

CROSS-REFERENCE TO RELATED APPLICATIONS

This application is a continuation of U.S. patent application Ser. No. 15/011,959 filed Feb. 1, 2016.

BACKGROUND

The present disclosure relates to additive manufacturing and, more particularly, to removing conglomerated powder from within an internal passage.

Precision engineered parts such as gas turbine components may be manufactured by an additive manufacturing operation such that features associated with conventional manufacturing processes, e.g., machining, forging, welding, casting, etc. can be eliminated to facilitate savings in cost, material, and time. Additive manufacturing often results in conglomerated powder building-up around, and within, the completed component as an artifact of the process. When additive manufacturing a component that has internal passages, this conglomerated powder often becomes entrapped in the internal passages and is difficult to remove.

There are currently few methods that directly and rapidly remove the conglomerated powder. One standard practice may include repeated use of an accelerated media blast, combined with mechanically scraping. Another standard practice includes, mega sonic or ultrasonic vibratory methods to liberate the powder particles. Oftentimes, such practices are still inefficient at removal of removing conglomerated powder from within the internal passages.

SUMMARY

A component according to one disclosed non-limiting embodiment of the present disclosure includes an additively manufactured component with a non-line of sight internal passage; and a multiple of agitators additively manufactured within the non-line of sight internal passage.

A further aspect of the present disclosure includes that the additively manufactured component include a first flange, a second flange, and a conduit with the internal passage therebetween.

A further aspect of the present disclosure includes that the conduit includes multiple bends.

A further aspect of the present disclosure includes that each of the multiple of agitators are spherical.

A method of additively manufacturing a component according to one disclosed non-limiting embodiment of the present disclosure includes vibrating a component at a particular known natural frequency of a multiple of agitators within a non-line of sight internal passage of an additively manufactured component to clean the internal passage of conglomerated powder with the multiple of agitators subsequent to completion of the additively manufacturing of the additively manufactured component.

A further aspect of the present disclosure includes mechanically working the conglomerated powder out of the internal passage with the multiple of agitators.

A further aspect of the present disclosure includes breaking up the conglomerated powder out of the internal passage with the multiple of agitators.

A further aspect of the present disclosure includes fixing the component then vibrating the component to a natural frequency which will excite the agitators such that the agitators vibrate with a force that will breaking conglomerated powder bonds surrounding each of the multiple of agitators.

A method of additively manufacturing a component according to one disclosed non-limiting embodiment of the present disclosure includes additively manufacturing a component with a non-line of sight internal passage; and additively manufacturing a multiple of agitators within the internal passage concurrent with additively manufacturing the component; fixing the component then vibrating the component to a natural frequency which will excite the agitators such that the agitators begin to vibrate with a force that will break the semi-sintered conglomerated powder bonds surrounding each of the multiple of agitators.

A further aspect of the present disclosure includes that each of the multiple of agitators to clean the internal passage of conglomerated powder subsequent to completion of the additively manufacturing of the additively manufactured component.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The components in the drawings are not necessarily to scale. Moreover, in the drawings, like reference numerals designate corresponding parts throughout the several views. The drawings that accompany the detailed description can be briefly described as follows.

DETAILED DESCRIPTION

Figure 1:
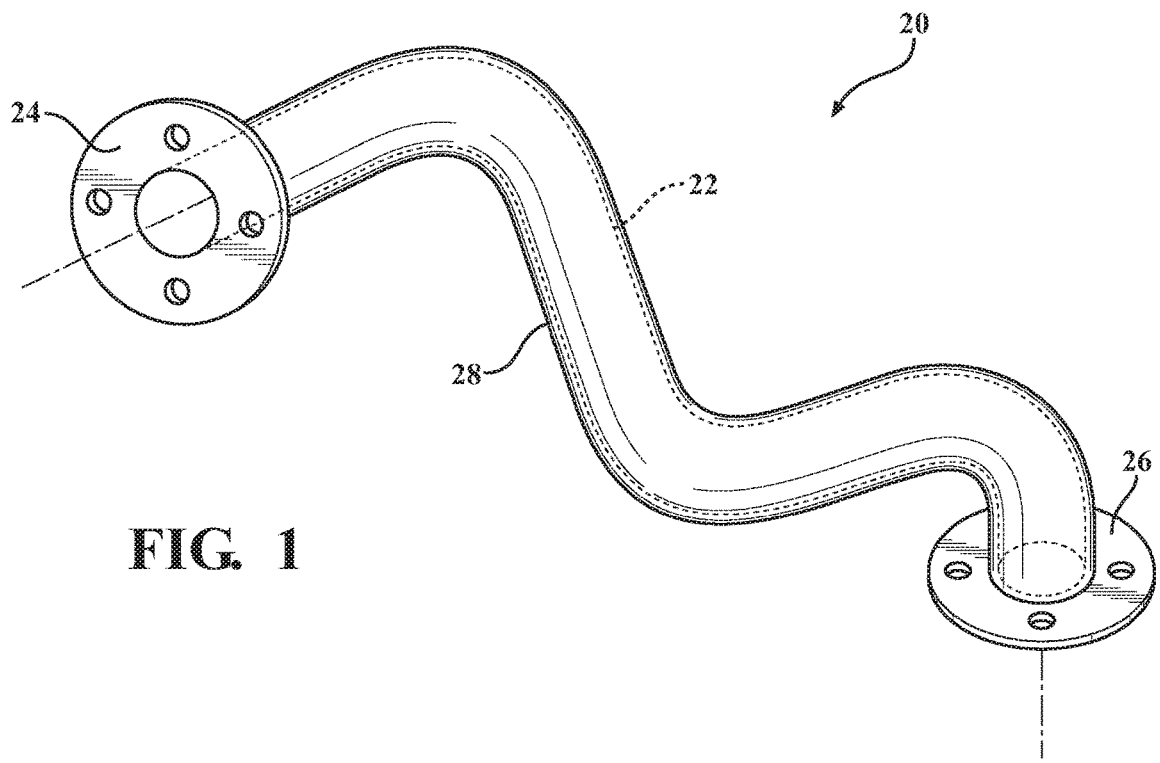
FIG. 1 is a perspective view of a representative additively manufactured component.

FIG. 1 schematically illustrates a component 20 that includes an internal passage 22. In this example, the component 20 may be a conduit such as that of a manifold, duct, flow passage, or other such component. The component 20 may include a first flange 24, a second flange 26, and a conduit 28 with the internal passage 22 therebetween. The internal passage 22 may be complex and be of a non-line of sight geometry that includes multiple bends. It should be appreciated that various additional or alternative segments and/or fittings may also be provided. It should be further appreciated that although a conduit type example is illustrated herein, other aerospace components, aircraft structures, as well as a wide variety of applications outside the aerospace industry, which include one or more internal passages, will benefit herefrom.

The component 20 may be readily manufactured with an additive manufacturing process that includes but are not limited to, Stereolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Laser Powder Bed Fusion (LPBF) and others. Although particular additive manufacturing processes are disclosed, those skilled in the art of manufacturing will recognize that any other suitable rapid manufacturing methods using layer-by-layer construction or additive fabrication can alternatively be used.

The additive manufacturing process sequentially builds-up layers of atomized alloy and/or ceramic powder material that include but are not limited to, 625 Alloy, 718 Alloy, 230 Alloy, stainless steel, tool steel, cobalt chrome, titanium, Ti—6Al—4V, nickel, aluminum alloys and others in atomized powder material form. Alloys such as 625, 718 and 230 may have specific benefit for parts that operate in high temperature environments, such as, for example, environments typically encountered by aerospace and gas turbine engine components.

The additive manufacturing process fabricates or "grows" components using three-dimensional information, for example a three-dimensional computer model. The three-dimensional information is converted into a plurality of slices, each slice defining a cross section of the component for a predetermined height of the slice. The additive manufactured component 20 is then "grown" slice-by-slice, or layer-by-layer, until finished. Each layer has an example size between about 0.0005-0.001 inches (0.0127-0.0254 mm). The additive manufacturing process facilitates manufacture of the relatively complex internal passage geometry to minimize assembly details, gun-drilling, and multi-component construction.

Figure 3:
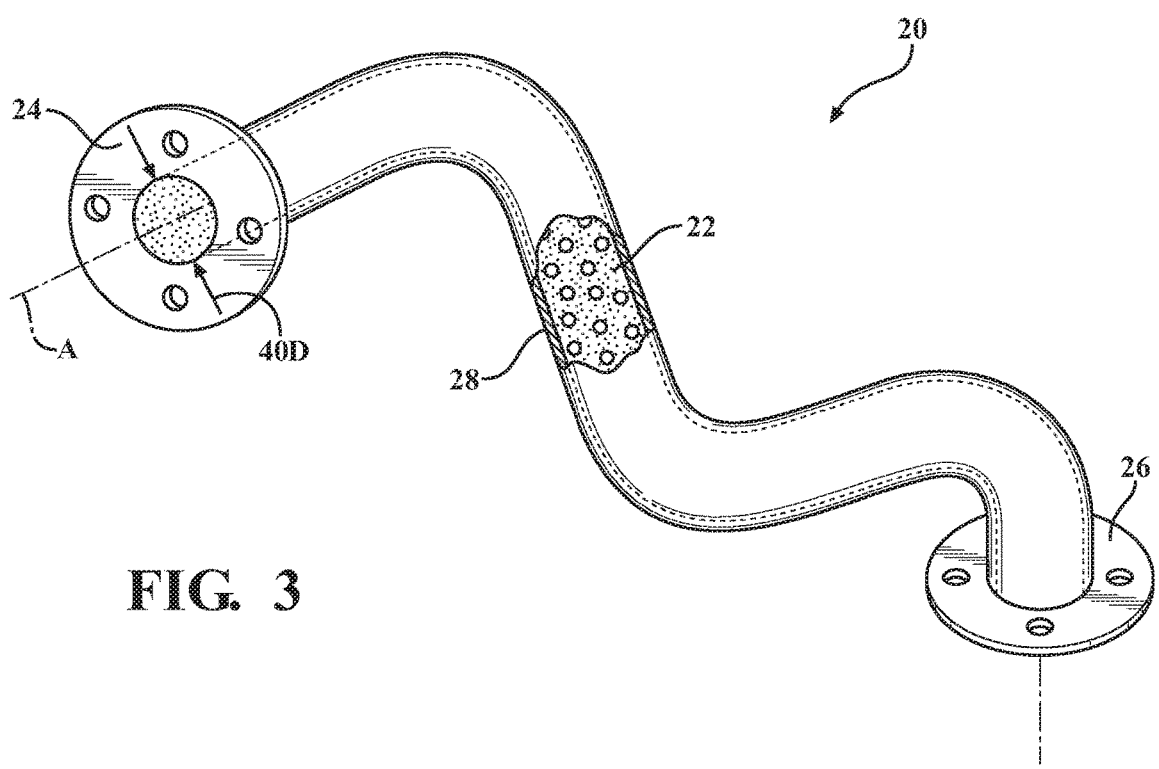
FIG. 3 is a perspective view of the additively manufactured component of FIG. 1 with a multiple of agitators for removing conglomerated powder from within an internal passage.
Figure 2:
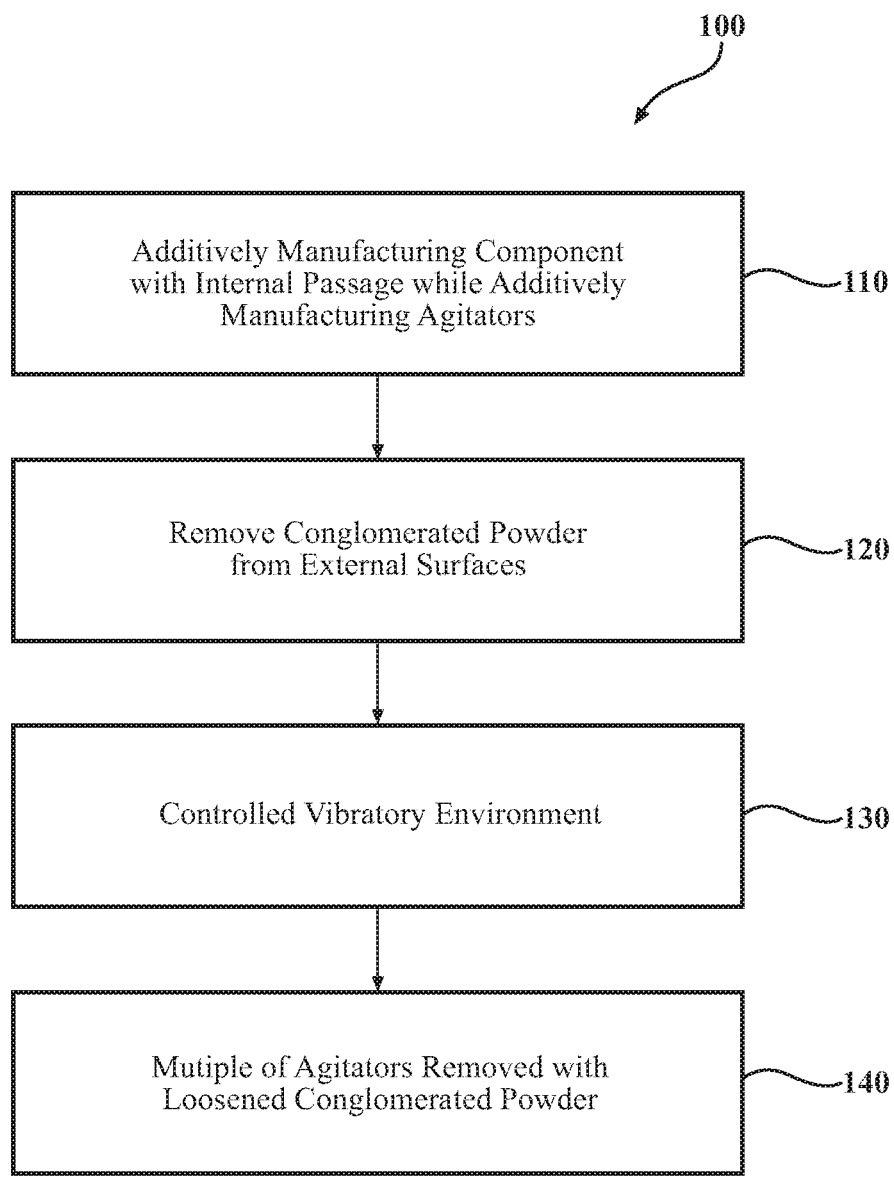
FIG. 2 is a method of additively manufacturing a component according to one disclosed non-limiting embodiment.

With reference to FIG. 2, one disclosed non-limiting embodiment of a method 100 to additively manufacture the component 20 initially includes additively manufacturing the component 20 with a multiple of agitators 40 within the internal passage 22 (step 110; FIG. 3). That is, the multiple of agitators 40 are additively manufactured simultaneously with the component 20. The multiple of agitators 40 form no part of the component 20 but are additively manufactured simultaneously with the component 20.

Figure 5:
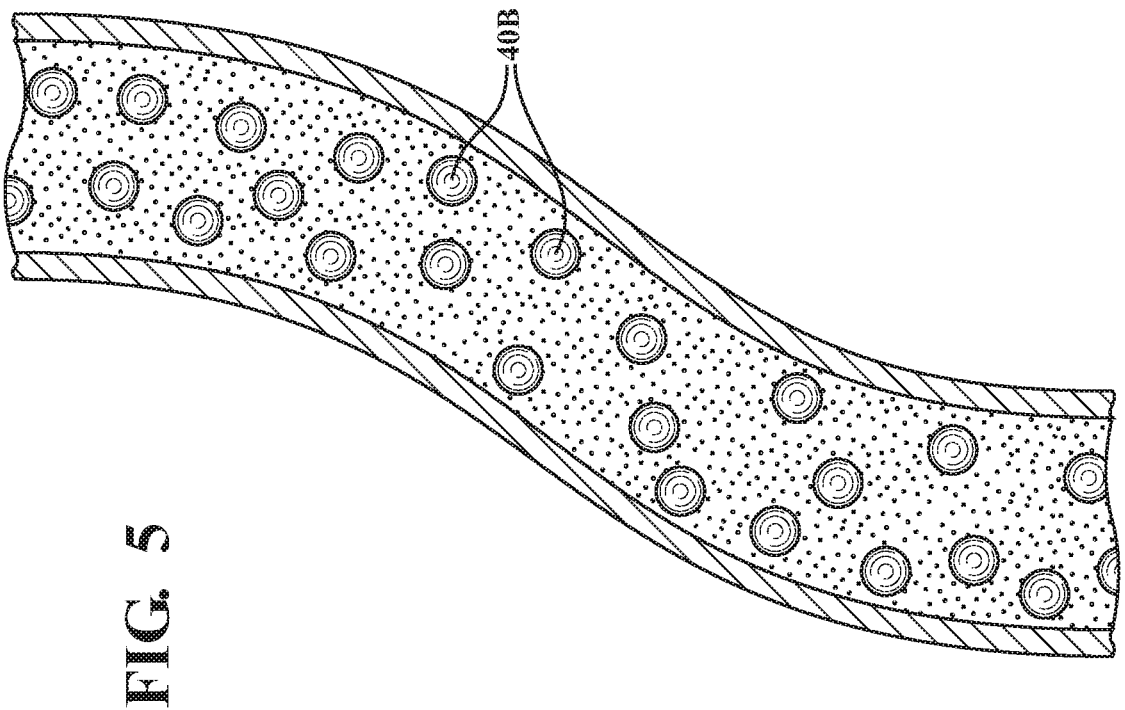
FIG. 5 is a perspective view of the additively manufactured component of FIG. 1 with a multiple of open agitators.
Figure 4:
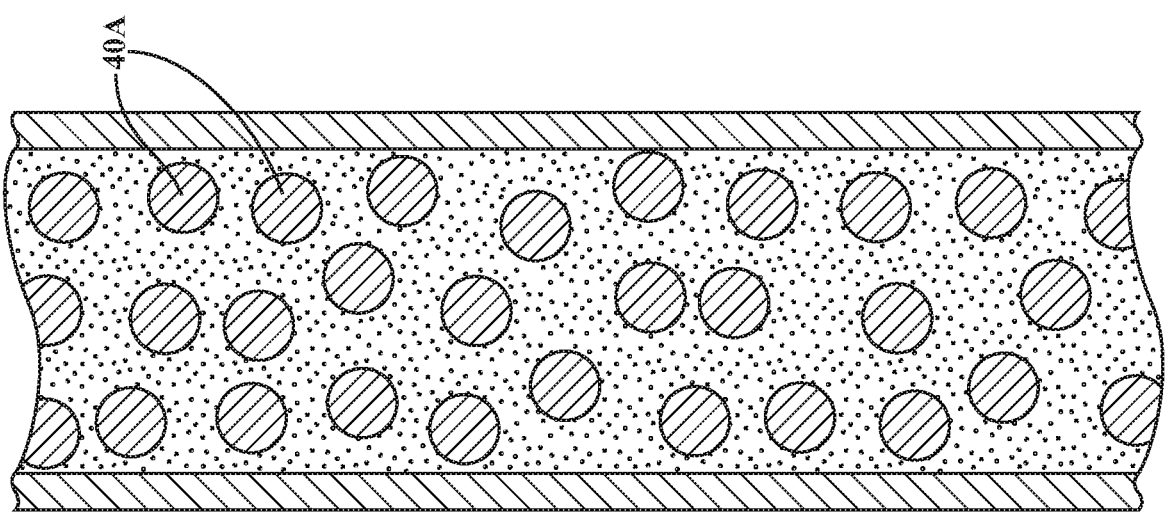
FIG. 4 is a perspective view of the additively manufactured component of FIG. 1 with a multiple of solid agitators.

In one embodiment, the internal passage 22 may define an aspect ratio with a diameter to length of less that 1:4. In one non-limiting dimension embodiment, the elongated member 40 diameter 40D dimension is between about 0.08 and 0.12 inches (~2-3 mm) in diameter and the internal diameter 22D dimension of the internal passage 22 is between about 0.5 and 1.0 inches (~13-25 mm) in diameter. Each of the multiple of agitators 40 may be of various sizes and shapes such as spherical, etc. The multiple of agitators 40 may also be either solid 40A (FIG. 4) or may be of an open 40B configuration (FIG. 5).

Figure 6:
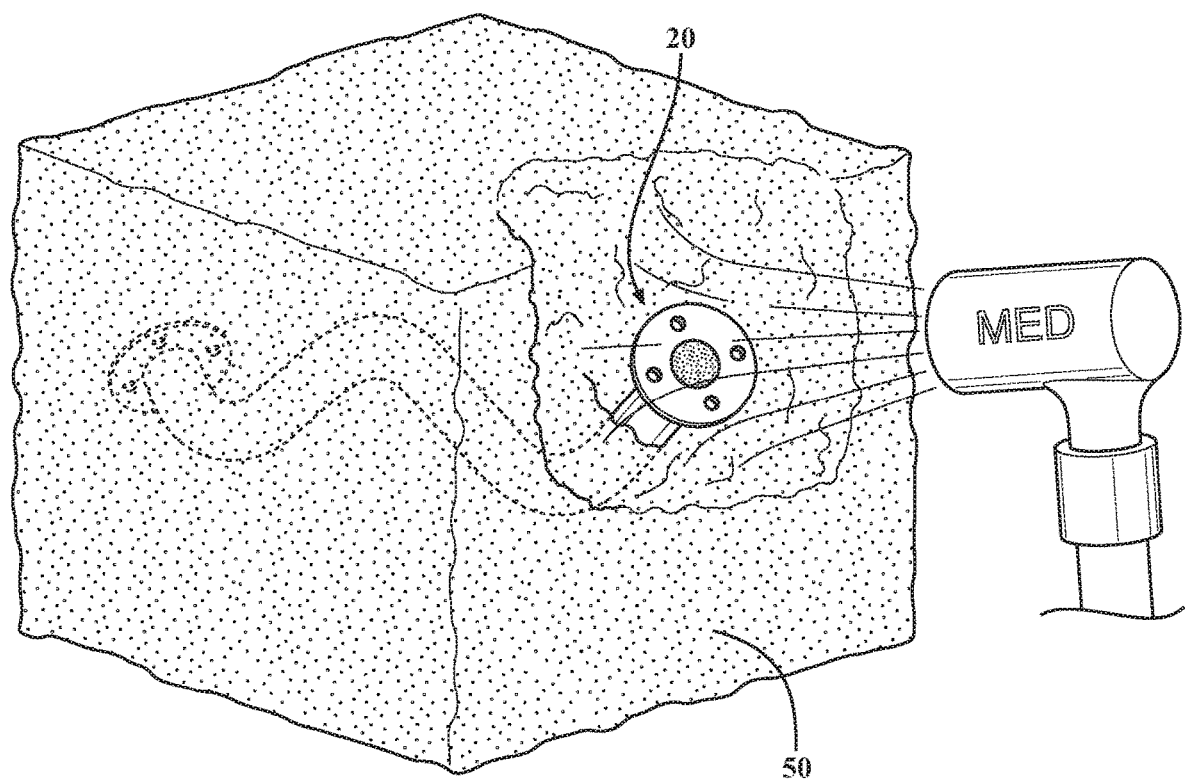
FIG. 6 is a perspective view of the additively manufactured component with the conglomerated powder.

Next, conglomerated powder 50 is removed from the external surfaces of the completed additively manufactured component 20 (step 120; FIG. 6). Removal is conventional and may include the use of accelerated media blast, mechanically scraping, vibratory or other methods. The completed component 20 thereby retains the multiple of agitators 40 within the internal passage 22 once the conglomerated powder 50 is removed from the external surfaces.

Figure 7:
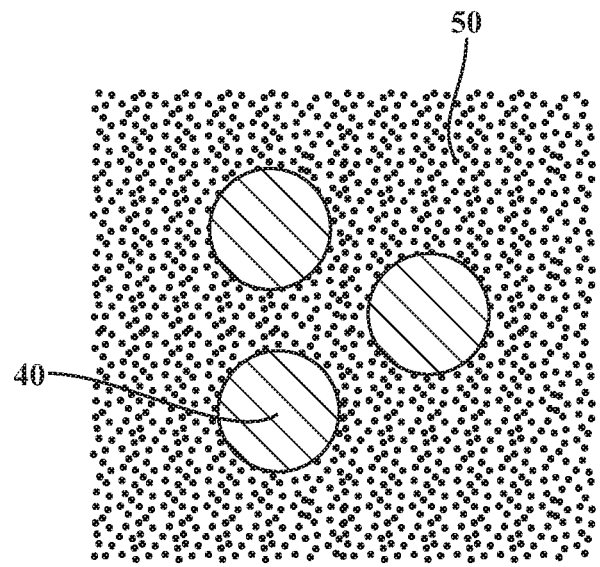
FIG. 7 is a perspective view of the multiple of agitators within the semi-sintered powder.
Figure 8:
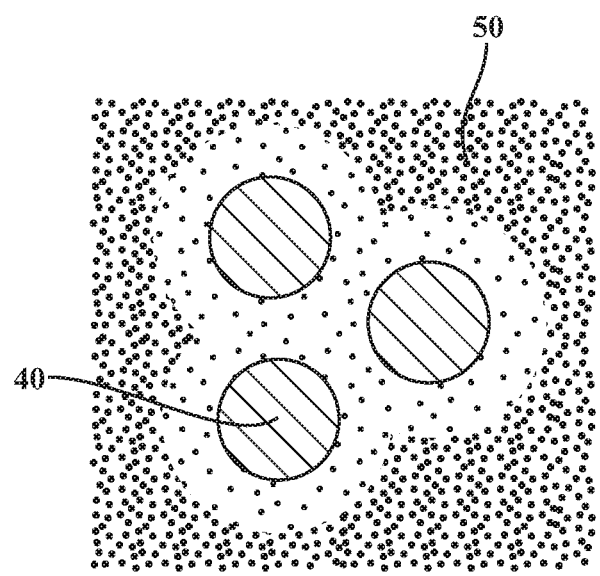
FIG. 8 is a perspective view of the multiple of agitators that have loosened the semi-sintered powder.

Next, the completed component 20 with powder filled cavities is input into a controlled vibratory environment (step 130). By fixing the completed component 20, and vibrating the completed component 20 to a natural frequency which will excite the agitators 40 (FIG. 7), the agitators 40 will begin to vibrate at large amplitudes and with a force that will break the semi-sintered conglomerated powder 50 bonds surrounding the agitators 40 (FIG. 8). When the conglomerated powder 50 begins to loosen surrounding the agitators 40, the flowability of the conglomerated powder 50 within the internal passage 22 will increase, and will begin to drain, or flow from the internal passage 22.

The multiple of agitators 40 operate to clean the internal passage 22 of the conglomerated powder 50. Next, the multiple of agitators 40 are readily removed with the loosened conglomerated powder 50 from the internal passage 22 (step 140; FIG. 1).

Utilization of the multiple of agitators 40 readily facilitates direct and rapid removal of the conglomerated powder from within internal passages.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to normal operational attitude and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A method of additively manufacturing a component, comprising:

vibrating a component at a particular known natural frequency of a multiple of agitators within a non-line of sight internal passage of an additively manufactured component to clean the internal passage of conglomerated powder with the multiple of agitators subsequent to completion of the additively manufacturing of the additively manufactured component, wherein the multiple of agitators comprise additively consolidated powder.

2. The method as recited in claim 1, wherein the vibrating step causes the multiple of agitators to mechanically break semi-sintered conglomerated powder bonds in conglomerated powder surrounding each of the multiple of agitators, thereby working the conglomerated powder out of the internal passage with the multiple of agitators.

3. The method as recited in claim 1, further comprising additively manufacturing the component with the internal passage and the multiple of agitators in the internal passage.

4. The method as recited in claim 1, further comprising fixing the component, and then vibrating the component at a natural frequency which excites the agitators such that the agitators vibrate with a force that breaks conglomerated powder bonds surrounding each of the multiple of agitators.

5. A method of additively manufacturing a component, comprising:

additively manufacturing a component with a non-line of sight internal passage;

additively manufacturing a multiple of agitators within the internal passage concurrent with additively manufacturing the component, wherein the agitators comprise additively consolidated powder; and fixing the component, and then vibrating the component at a natural frequency to excite the agitators such that the agitators vibrate with a force that breaks semi-sintered conglomerated powder bonds in conglomerated powder surrounding each of the multiple of agitators.

6. The method as recited in claim 5, wherein each of the multiple of agitators clean the internal passage of conglomerated powder subsequent to completion of the additively manufacturing of the additively manufactured component.

* * * * *